United States Patent [19]

Cofek

[11] 3,849,004

[45] Nov. 19, 1974

[54] PHOTO-DETECTOR FOR OPTICAL INSPECTION SYSTEM

[75] Inventor: Henry R. Cofek, Fairfield, Conn.

[73] Assignee: Geisco Associates, Cheshire, Conn.

[22] Filed: Oct. 11, 1973

[21] Appl. No.: 405,448

[52] U.S. Cl.................. 356/200, 356/225, 350/17, 350/271, 250/563, 250/572
[51] Int. Cl. ........................................... G01n 21/18
[58] Field of Search ...... 356/200, 209, 225; 350/17, 350/271; 250/563, 572

[56] References Cited
UNITED STATES PATENTS 2,672,799   3/1954   Terwilliger .................... 350/271 X
3,748,047   7/1973   Millgard et al. .................... 356/200

*Primary Examiner*—Ronald L. Wibert
*Assistant Examiner*—Paul K. Godwin
*Attorney, Agent, or Firm*—DeLio and Montgomery

[57] ABSTRACT

The photodetector in an optical inspection system is provided with a variable spatial filter which is defined with a non-uniform light-receiving elongated slot to compensate for the non-uniformity of light energy on the material under inspection as a scanning beam moves through a predetermined angle in scanning across the material.

2 Claims, 8 Drawing Figures

PHOTO-DETECTOR FOR OPTICAL INSPECTION SYSTEM

This invention relates to optical systems, and more particularly relates to a method and system for scanning the surface of sheet or web material and detecting defects or discontinuities in the surface, and the location thereof.

Optical inspection systems are known which detect surface defects of a moving sheet or web material. Generally in such systems a beam of light is utilized to scan transversely of the direction of movement of the web and a photodetector is positioned to be responsive to light changes caused by varying characteristics of the material which may be caused by discontinuities or defects in the surface and generating a pulse signal in response thereto.

Flaws or discontinuities in the material produce small changes in reflectivity or transmitivity, and the detector must be able to respond to such small changes as well as having a fast response.

The detector is generally a photo-multiplier tube (PMT) which produces an output proportional to the light incident thereon, and provides a pulse-like output in response to a transient change in the incident light. The PMT is positioned in a housing having an opening therein in proximity with the line of scan of the beam, and designed to accept only transmitted or reflected light of the inspection beam. Where the dimension of scan is large, say 25 inches, the light reflected or transmitted to the PMT is greatest at the center and smallest at the ends of scan. This results in a base line signal output which approximates a cosine curve in the output of the PMT.

Inasmuch as the PMT signal processors must be biased to detect changes in output beyond predetermined threshold levels, such curvature with time in the base line signal presents problems in processing the PMT output to detect flaw representative pulses on the base line signal.

Accordingly, the present invention provides a new and improved photodetector including a PMT housing having a varble spacial filter which may be adjusted to provide a linear base line output from the PMT regardless of the position of the scanning beam as it traverses the material under inspection.

Briefly stated, the invention in one form thereof includes a means for moving material across an inspection area, while a concentrated beam of light is moved to scan transversely of the direction of movement of the material.

A photodetector, including a photo-multiplier tube within a housing, is positioned to detect the light reflected from the material and any changes therein. The housing has a lower opening to admit light of the photo-multiplier tube which extends the length of the scan of the light beam on the material. A variable spacial filter is defined in the bottom of the housing, which filter defines the opening to the detector housing. The filter is so arranged that an elongated opening along the bottom of the detector housing may be shaped to compensate for the varying intensity of the reflection of the beam at different points across the width of the material.

An object of this invention is to provide a new and improved photodetector system for an optical inspection system.

Another object of this invention is to provide a new and improved variable spacial filter for a photodetector which receives transmitted or reflected light from a beam which sweeps across a plane surface.

The features of the invention which are believed to be novel are particularly pointed out and distinctly claimed in the concluding portion of this specification. However, the invention both as to its operation and organization, together with further objects and advantages thereof, may best be appreciated by reference to the following detailed description taken in conjunction with the drawings wherein:

FIG. 6 is a view seen in the plane of line 6—6 of FIG. 5; and

FIGS. 7a and 7b are diagrams of representative waveforms of the output of the photodetector without and with a spacial filter.

Figure 1:
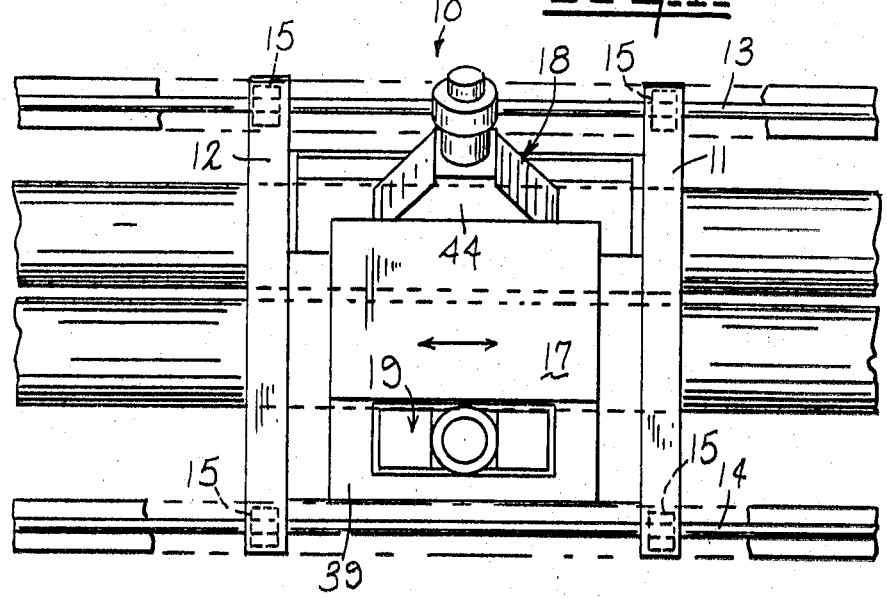
FIG. 1 is a plan view of the apparatus embodying the invention.
Figure 2:
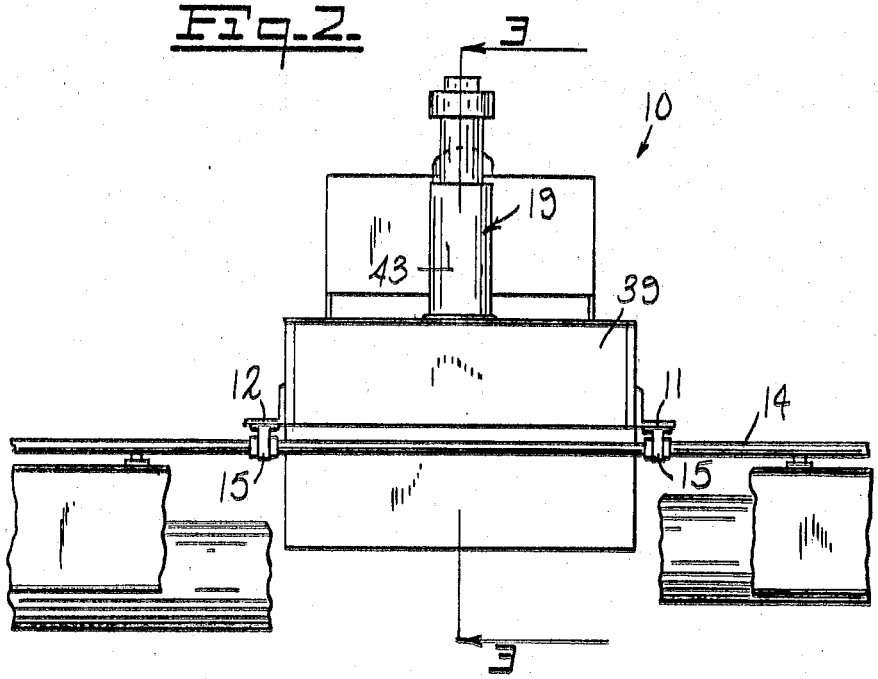
FIG. 2 is an elevation of the apparatus of FIG. 1.
Figure 3:
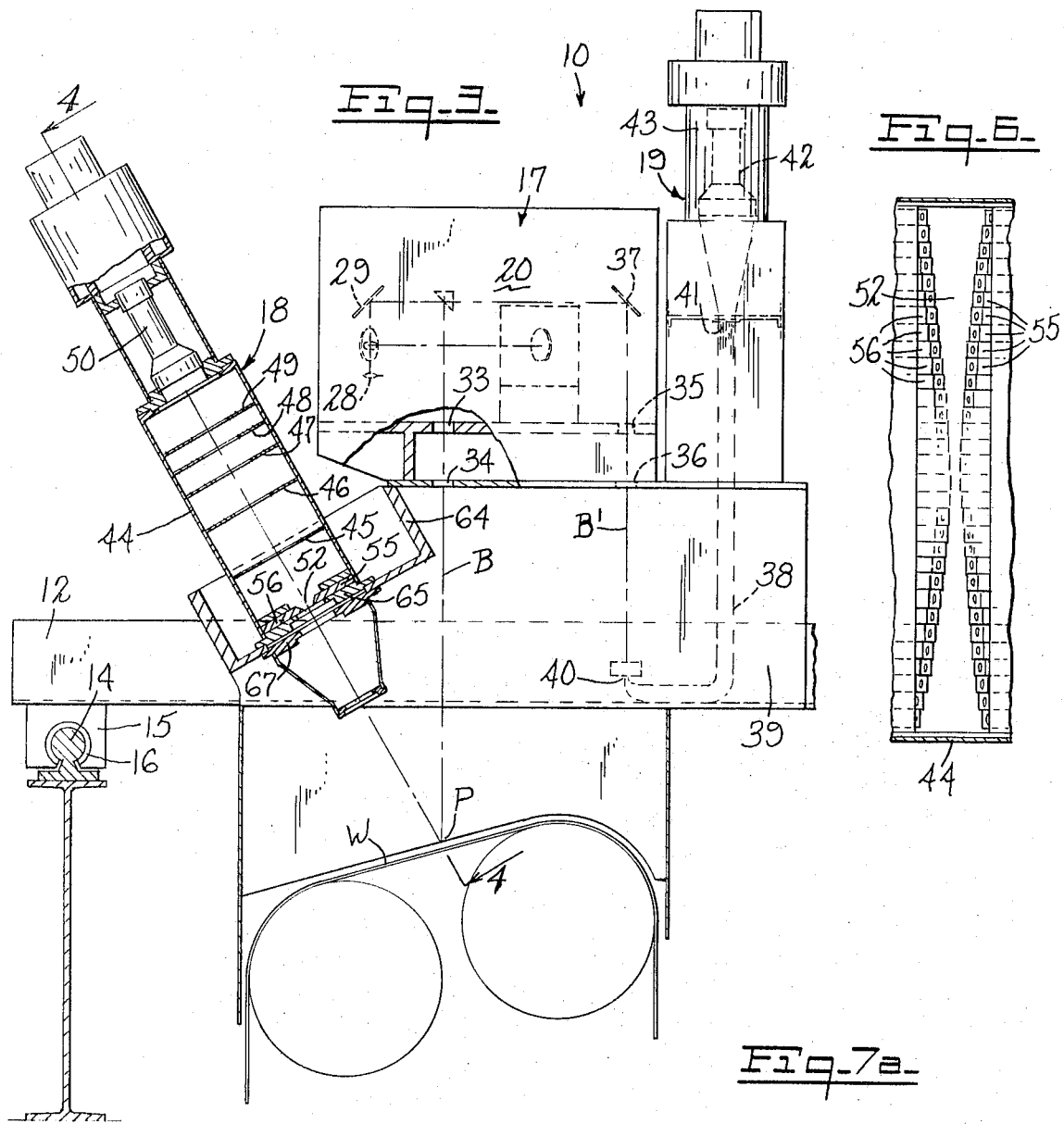
FIG. 3 is a view partially in section of the photodetector seen in the plane of lines 3—3 of FIG. 2.

FIGS. 1–6 exemplify an overall assembly 10 embodying the invention which includes support arms 11 and 12 movable linearly on guide rails 13 and 14 along the width of a web W of material to be inspected. Depending from arms 11 and 12 at each end thereof are members 15 (FIG. 3) including bushings 16 therein which move on the guide rails. The assembly 10 includes a housing member 17 for the optical system, a reflected light detector housing and a housing 19 for a lateral position monitor.

A source (FIG. 3) of a concentrated light beam, which may be a helium neon laser, directs a highly concentrated beam of light L from an optical system 20 as disclosed in co-pending application Ser. No. 405,449 filed Oct. 11, 1973.The beam B is directed in a plane towards the material to be inspected through elongated slots 33 and 34 in housing 17 and will repetitively scan across the material W in the path P (FIGS. 3 and 4) to an oscillating galvanometer mirror 28, a reflecting mirror 29 and a beam splitter 30 to define a scanning beam B and a monitoring beam B'. The motion of the mirror 28 produces scan and retrace motions of beam B across the width of web W.

A multiplicity of flexible fiber optic rods 38 are disposed in housing 39 with the ends 40 thereof linearly aligned in predetermined spacing and arranged to receive light energy of the beam B' as it sweeps across mirror 37 and is reflected downwardly through apertures 35 and 36. The optical fiber rods are then carried in a bundle so that the ends 41 thereof will repetitively present the pulses of light energy from beam B' to a detector in the form of a photo-multiplier tube disposed in a housing 43.

This arrangement provides a means for continuously monitoring the lateral positon of the primary beam B as it moves across a piece to be inspected by monitoring the position of the auxiliary beam B'. The ends 41 of the fiber optic rods which may number as many as 500 will thus always correspond to a discrete location in an X-axis of a coordinate system where the Y-axis is the direction of movement of the sheet or web material. As the beam B' sweeps across mirror 37 and is reflected downwardly, it will move across the aligned ends 40 of the fiber optical rods 38 and each incremental movement along the aligned ends 40 is a count of the spacing increment therebetween. This count is converted to a pulse train by detector 42, as hereinafter explained.

This same function could be achieved through use of a grating in which light from beam B' is transmitted through uniformly spaced openings along the length of the grating and would appear as pulses of light on the other side of the grating.

The reflected light detector is carried in housing 18 and mounted so that the longitudinal axis of the photo-detector coincides with the path P of incidence (FIG. 3) of the beam B on the web W.

The detector 18 is best shown in FIGS. 3–6 and comprises a first housing member 44 having a plurality of baffles 45–49 positioned therein to define the light-receiving passage of the detector and eliminate random light from reaching the detector. A photodetector in the form of a photo-multiplier tube 50 is positioned above the openings defined by the baffles.

The detector has an elongated slot-like opening 52 defined at the bottom thereof, and is provided with an adjustable spacial filter. The filter defines a spacial opening 52 as most clearly seen in FIG. 6. The filter is comprised of a plurality of adjustably positionable elements 55 and 56 on either side thereof. The elements 55 and 56 are positionable on surfaces 57 and 58, respectively, as by means of bolts 59 and 60, respectively, threadably received therein to provide any desired shape of the opening 52. Disposed between the elements 55 and 56 and the respective bolts are biasing springs 61 and 62, respectively, to maintain a set position.

Figure 4:
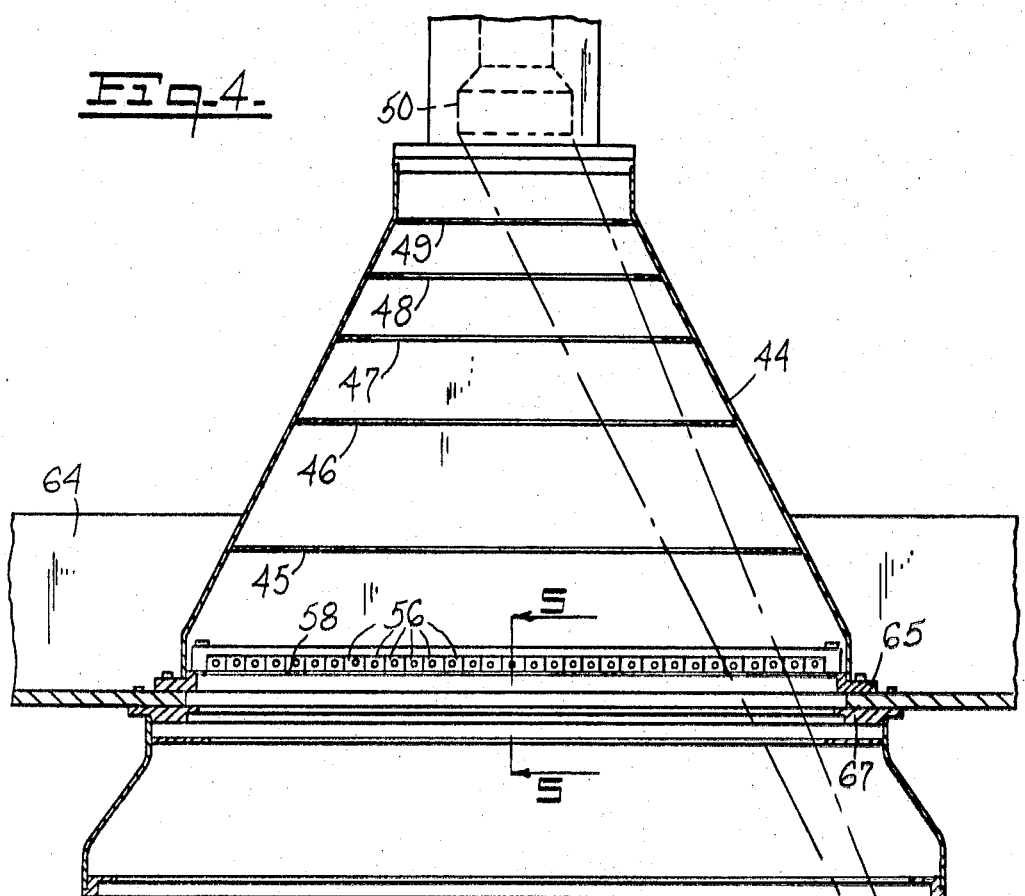
FIG. 4 is a view seen in the plane of lines 4—4 of FIG. 3.
Figure 5:
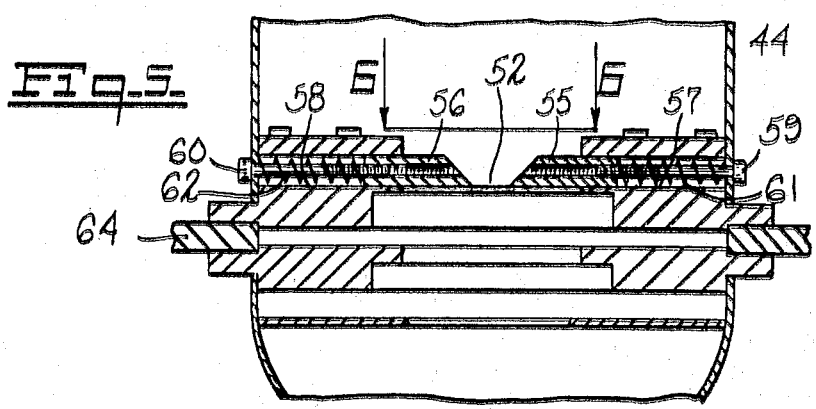
FIG. 5 is an enlarged view of the lower portion of the photodetector housing seen in the plane of lines 5—5 of FIG. 4.

The purpose of the elements 55 and 56 is to define the opening 52 to compensate for the change in the magnitude of the light reflected toward photo-multiplier 50 as the scanning spot moves off the center C of the Web W, as exemplified in FIG. 4. The reflected light at the lateral center C of the web W will be right on the axis of photo-multiplier tube 50. As the beam B moves toward the edges of the web W the reflected light is increasingly off-axis, and the energy level of the reflected light as normally seen by the photo-multiplier will decrease and be a minimum at the edges. Therefore, the opening 52 may be defined with a lesser dimension at its center than at its edges as a function of the width of the web W, and characteristics of the material.

The housing 18 is mounted in fixed relation to housing 17 through member 64 and an upper adaptor 65 which provide the surfaces 57 and 58. The lower portion of housing 17 is mounted to member 64 through a lower adaptor member 67.

Refelected light from discontinuities in the surface of the material produces a change in the level of output of photo-multiplier tube 50. Such changes will appear on the base line waveform of FIGS. 7a dn 7b as pulse-like signals occur. The lateral position on the material at which time such output is varied is monitored, as described in the aforementioned co-pending application to provide an indication of the location of such defect.

The effect of the variable spacial filter is to change the response of the photo-multiplier tube during a sweep of the beam B from the general cosine curve as shown in times T1 and T3 in FIG. 7a, to the level base line response as shown in times T1 and T3 in FIG. 7b. The time T2 represents the retrace time of the beam B.

The variable spacial filter disclosed thus reshapes the output of the photo-multiplier tube to an essentially level base line and facilitates the detection of pulse-like signals on the base-line signal.

If the output of the photo-multiplier tube is as shown in FIG. 7a, a flaw indicative pulse P1 thereon may have an absolute magnitude no greater than the base value at the center of the seam. However, when the base line waveform is compensated to an essentially level or constant value as shown in FIG. 7b, a pulse P2 of the same magnitude as pulse P1 may easily be detected above the level base line signal value.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In an optical inspection system of the type in which a beam of light is scanned across the surface of material to be inspected on a photodetector is positioned to be responsive to changes in the level of light energy on said material due to discontinuities therein; a photodetector comprising a housing having an elongated opening at the lower portion thereof adapted to admit light from the beam on the material, said opening being sufficiently long as to cover the dimension of scan of the beam across the material, a photo-sensitive device positioned in said housing above said opening, said photo-sensitive device being effective to provide an electrical output proportional to the light energy received thereby, means defining said opening to have a varying width along the length thereof, said defining means being adjustably positionable on said housing, with respect to the width of said opening.

2. The system of claim 1 wherein said defining means comprises a plurality of elements on said housing in two spaced apart rows, the elements of each row being individually adjustable.

* * * * *

PO-1050
(5/69)

UNITED STATES PATENT OFFICE
CERTIFICATE OF CORRECTION

Patent No. 3,849,004            Dated November 19, 1974

Inventor(s) Henry R. Cofek

It is certified that error appears in the above-identified patent and that said Letters Patent are hereby corrected as shown below:

Column 1, line 38, after "processing" insert -- of --.
Column 1, line 43, "varble" should read -- variable --.
Column 2, line 36, after "detector housing" insert -- 18 --.
Column 2, line 62, "positon" should read -- position --.
Column 4, line 1, "dn" should read -- and --.

Signed and sealed this 4th day of February 1975.

(SEAL)
Attest:

McCOY M. GIBSON JR.            C. MARSHALL DANN
Attesting Officer              Commissioner of Patents